(12) United States Patent
Shimamura et al.

(10) Patent No.: US 11,509,158 B2
(45) Date of Patent: Nov. 22, 2022

(54) INFORMATION PROCESSING APPARATUS, CONTROL METHOD OF INFORMATION PROCESSING APPARATUS, AND NON-TRANSITORY COMPUTER-READABLE STORAGE MEDIUM

(71) Applicant: BROTHER KOGYO KABUSHIKI KAISHA, Nagoya (JP)

(72) Inventors: Yasuhiro Shimamura, Nagoya (JP); Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 112 days.

(21) Appl. No.: 17/086,327

(22) Filed: Oct. 31, 2020

(65) Prior Publication Data

US 2021/0135476 A1  May 6, 2021

(30) Foreign Application Priority Data

Oct. 31, 2019 (JP) .............................. JP2019-198326

(51) Int. Cl.
*H02J 7/00* (2006.01)
*H04N 1/00* (2006.01)

(52) U.S. Cl.
CPC ...... *H02J 7/007182* (2020.01); *H02J 7/0044* (2013.01); *H04N 1/00901* (2013.01); *H04N 1/00907* (2013.01)

(58) Field of Classification Search
None
See application file for complete search history.

(56) References Cited

U.S. PATENT DOCUMENTS

| 11,258,292 | B2* | 2/2022 | Yamakawa | ......... H02J 7/00712 |
| 2015/0318700 | A1* | 11/2015 | Inakagata | ................. H02J 3/32 |
| | | | | 307/20 |
| 2015/0380924 | A1 | 12/2015 | Ohwaki | |
| 2020/0251913 | A1* | 8/2020 | Zhou | ..................... H02J 7/0047 |

FOREIGN PATENT DOCUMENTS

JP 2016-13024 A 1/2016
JP 2016-72685 A 5/2016

* cited by examiner

*Primary Examiner* — Arun C Williams
(74) *Attorney, Agent, or Firm* — Kenealy Vaidya LLP

(57) ABSTRACT

An information processing apparatus includes a power processor, an interface, a first detector that detects at least one of a voltage value and a current value on an electric power line which connects the power processor and the interface, a second detector that detects at least one of a voltage value and a current value on the electric power line, a switch that switches a supply of electric power supplied from the interface to an outside, and a controller. The controller controls the switch to restrict the electric power supplied from the interface to an outside in a case where at least one of a detection value of the first detector and a detection value of the second detector is equal to or greater than a threshold value.

21 Claims, 10 Drawing Sheets

INFORMATION PROCESSING APPARATUS, CONTROL METHOD OF INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority from prior Japanese patent application No. 2019-198326, filed on Oct. 31, 2019, the entire contents of which are incorporated herein by reference.

TECHNICAL FIELD

The present disclosure relates to an information processing apparatus that supplies electric power to an external device, a control method of the information processing apparatus, and a non-transitory computer-readable storage medium storing a computer program executed by a computer mounted on the information processing apparatus.

BACKGROUND

In the related art, an information processing apparatus which supplies electric power to an external device via an interface is suggested. For example, JP-A-2016-13024 discloses an overcurrent detection circuit which monitors a current value of current supplied by a current monitoring unit in a case of supplying electric power from a USB port of USB PD (USB Power Delivery) standards to an external device. When a detected current value exceeds a threshold value, the overcurrent detection circuit turns off a switch connected to a Vbus and stops the supply of electric power from the USB port to the external device.

JP-A-2016-72685 discloses an image forming apparatus in which a Vbus switch is connected between a power supply and a USB port. The Vbus switch stops the supply of electric power to the USB port when it is detected that overcurrent flows.

SUMMARY

The USB port complying with the USB PD standards can supply a larger amount of electric power than a conventional USB port. Therefore, it is required that an information processing apparatus having this type of an interface such as the USB port complying with the USB PD standards securely restricts the supply of electric power in a case where an electric power abnormality such as overcurrent and overvoltage occurs, in order to protect an electronic device in the information processing apparatus, an external device and the like.

An object of the present disclosure is to provide an information processing apparatus that enables to restrict a supply of electric power with more reliability in a case where an electric power abnormality occurs, a control method of the information processing apparatus, and a non-transitory computer-readable storage medium storing a computer program executed by a computer mounted on the information processing apparatus.

A first aspect of the present disclosure is an information processing apparatus including:
 a power processor;
 an interface;
 a first detector configured to detect at least one of a voltage value and a current value on an electric power line that connects the power processor and the interface;
 a second detector configured to detect at least one of a voltage value and a current value on the electric power line;
 a switch configured to switch a supply of electric power supplied from the interface to an outside; and
 a controller configured to:
 control the switch to restrict the electric power supplied from the interface to an outside in a case where at least one of a detection value of the first detector and a detection value of the second detector is equal to or greater than a threshold value.

The contents of the first aspect of the present disclosure can be implemented not only as the information processing apparatus but also as a control method of controlling the information processing apparatus and a non-transitory computer-readable storage medium storing a computer program that is executed by a computer mounted on the information processing apparatus.

A second aspect of the present disclosure is a control method of the information processing apparatus including:
 a power processor;
 an interface;
 a first detector configured to detect at least one of a voltage value and a current value on an electric power line that connects the power processor and the interface;
 a second detector configured to detect at least one of a voltage value and a current value on the electric power line; and
 a switch configured to switch a supply of electric power supplied from the interface to an outside,
 the control method including the step of:
 controlling the switch to restrict the electric power supplied from the interface to an outside in a case where at least one of a detection value of the first detector and a detection value of the second detector is equal to or greater than a threshold value.

A third aspect of the present disclosure is a non-transitory computer-readable storage medium storing a computer program, when executed by a computer mounted on the information processing apparatus including:
 a power processor;
 an interface;
 a first detector configured to detect at least one of a voltage value and a current value on an electric power line that connects the power processor and the interface;
 a second detector configured to detect at least one of a voltage value and a current value on the electric power line; and
 a switch configured to switch a supply of electric power supplied from the interface to an outside,
 the computer program being configured to cause the information processing apparatus to:
 control the switch to restrict the electric power supplied from the interface to an outside in a case where at least one of a detection value of the first detector and a detection value of the second detector is equal to or greater than a threshold value.

According to the information processing apparatus, the control method of the information processing apparatus and the non-transitory computer-readable storage medium storing the computer program of the present disclosure, the two detectors of the first and second detectors are connected to one electric power line to monitor at least one of the current value and the voltage value. When at least one of the detection value of the first detector and the detection value of the second detector is equal to or greater than the threshold value, the controller controls the switch to restrict the supply of electric power supplied to an outside. Thereby, even if one of the first and second detectors is out of order, it is possible to monitor the current value or the voltage value on the electric power line by the other detector. Therefore, it is possible to restrict the supply of electric power supplied to the outside with more reliability in the case where overvoltage or overcurrent occurs.

DETAILED DESCRIPTION

Hereinbelow, a portable printer 1 that is an embodiment of the information processing apparatus of the present disclosure will be described with reference to FIG. 1.

(1. Configuration of Portable Printer)

Figure 1:
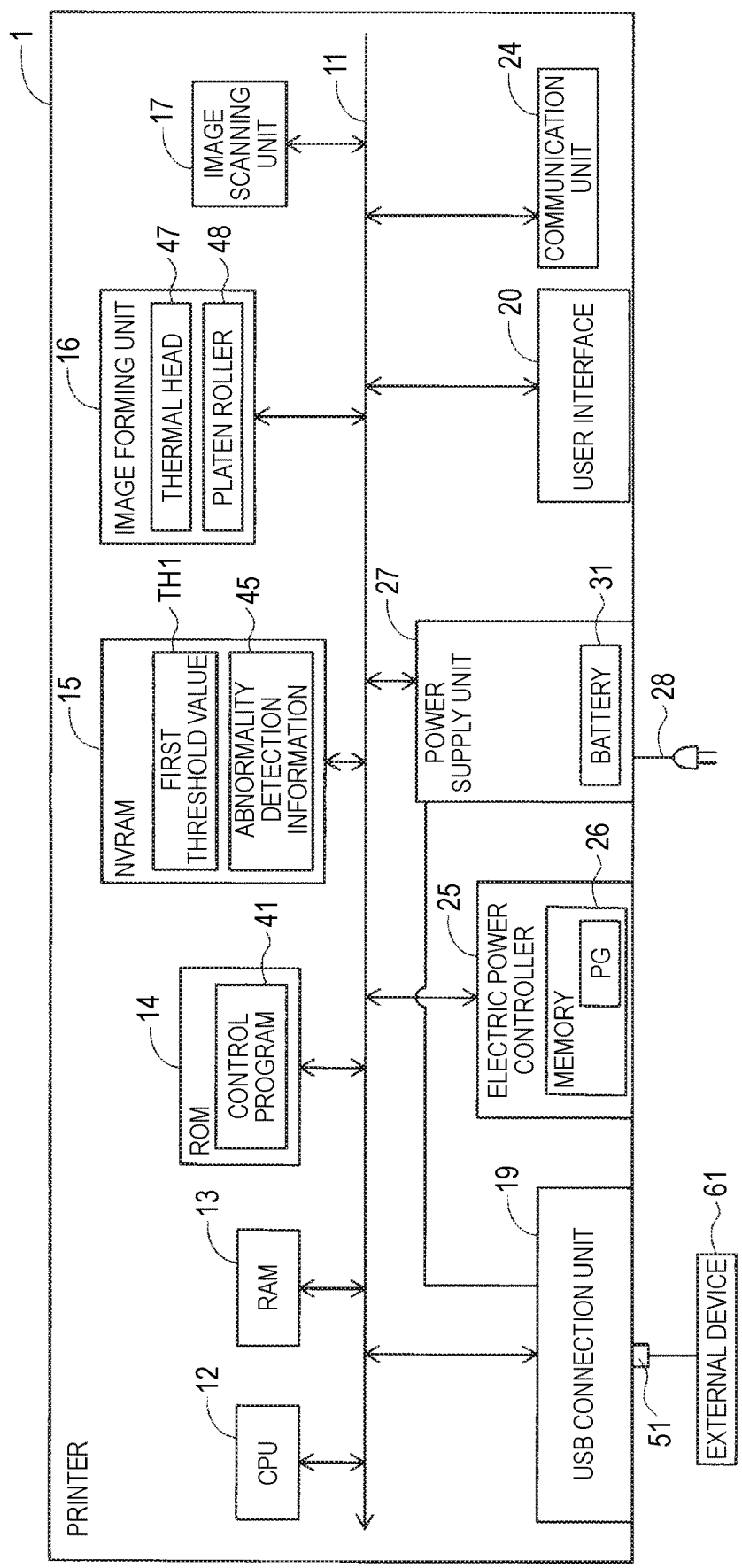
FIG. 1 is a block diagram depicting an electrical configuration of a printer in accordance with an embodiment.

FIG. 1 depicts an electrical configuration of a portable printer 1 in accordance with the present embodiment. The printer 1 is, for example, a portable printing device. The printer 1 prints image data of a print job received from a PC, a smartphone or the like via wired communication or wireless communication on a predetermined sheet (thermal paper), for example. The printer 1 includes a CPU 12, a RAM 13, a ROM 14, an NVRAM 15, an image forming unit 16, an image scanning unit 17, a USB (Universal Serial Bus) connection unit 19, a user interface 20, a communication unit 24, an electric power controller 25, a power supply unit 27, and the like. The CPU 12 and the like are connected to each other via a bus 11. The CPU 12 and the electric power controller 25 are a computer functioning as a controller of the printer 1.

The ROM 14 is a non-volatile memory such as a flash memory, for example, and stores therein a variety of programs such as a control program 41. For example, the CPU 12 executes the control program 41 read out from the ROM 14, thereby activating a system of the printer 1. In the meantime, the data storage destination is an example. For example, the control program 41 may also be stored in the NVRAM 15. The storage unit in which the control program 41 is stored may be a computer-readable storage medium. As the computer-readable storage medium, a recording medium such as a CD-ROM and a DVD-ROM may also be adopted, in addition to the above example.

The control program 41 is firmware for collectively controlling each unit of the printer 1, for example. The CPU 12 controls each unit connected with the bus 11 while executing the control program 41 and temporarily storing a result of executed processing in the RAM 13. In descriptions below, the CPU 12 executing the control program 41 may also be simply described as the CPU 12. For example, the description "the CPU 12" may mean "the CPU 12 that executes the control program 41".

The NVRAM 15 is a non-volatile memory. The NVRAM 15 stores a first threshold value TH1 and abnormality detection information 45. The first threshold value TH1 is, for example, a threshold value that is used for comparison with a voltage value detected by a first voltage detection circuit 34 (refer to FIG. 2). The abnormality detection information 45 is information indicating that an electric power abnormality is detected. The first threshold value TH1 and the abnormality detection information 45 will be described in detail later.

The image forming unit 16 includes a line-type thermal head 47, for example, and prints an image on a sheet by a direct thermal method under control of the CPU 12. The image forming unit 16 conveys the sheet by rotating a platen roller 48 provided to face the thermal head 47. For example, upon start of printing, when a sheet is inserted into an insertion opening of the printer 1, the inserted sheet is guided to a facing part between the platen roller 48 and the thermal head 47 and is discharged from a discharge opening after the printing is completed.

The configuration of the image forming unit 16 is an example. The image forming unit 16 may include a toner cartridge, a photosensitive drum, a developing roller, an exposure device and the like, and may execute the printing by an electrophotographic method. Alternatively, the image forming unit 16 may include an inkjet head, an ink cartridge and the like, and may execute the printing by an inkjet method, for example.

The image scanning unit 17 includes a document platen (not shown) and an image sensor such as a CIS (Contact Image Sensor), a CCD (Charge-Coupled Device) and the like. The image scanning unit 17 moves the CIS and the like relative to a document placed on the document platen, scans the document to generate image data, and stores the image data in the RAM 13.

The USB connection unit 19 is an interface which performs communication and electric power transfer that comply with USB PD (USB Power Delivery) standards, for example. The USB connection unit 19 includes a receptacle 51 as a connector. The USB connection unit 19 performs data communication and electric power transfer with a variety of external devices 61 connected to the receptacle 51. In FIG. 1, as an example, one external device 61 is connected to one receptacle 51. As the external device, for example, a variety of devices that can connect based on USB standards, such as a smartphone, a personal computer, a laptop PC, a printer, an external hard disk, a USB memory, a card reader, and the like may be adopted. In the meantime, the USB connection unit 19 may include a plurality of the receptacles 51.

The receptacle 51 is, for example, a connector that complies with USB Type-C standards. The receptacle 51 has a plurality of pins for performing data communication and electric power transfer. For example, the receptacle 51 has, as the plurality of pins, a TX pin, an RX pin, a D pin, a Vbus pin, a CC pin, a ground pin and the like of USB Type-C standards. In the meantime, the pin may also be referred to as a signal line. The receptacle 51 performs data communication by using any one of the TX pin, the RX pin and the D pin, for example. The D pin is, for example, a Data pin and indicates D+/D−. The receptacle 51 is performs a supply of electric power and a reception of electric power by using the Vbus pin.

The CC pin is a pin that is used so as to decide an electric power role, for example, and includes a CC1 pin and a CC2 pin, in correspondence to the front and back of a plug connected to the receptacle 51. The CC pin is also used as a signal line of communication relating to device management, such as an alert message. The receptacle 51 has a dual role power (DRP) function capable of switching to an electric power source that is an electric power role for supplying electric power or an electric power sink that is an electric power role for receiving electric power.

The electric power controller 25 controls supply and reception of electric power, and transmission and reception of data via the USB connection unit 19. The electric power controller 25 decides an electric power role, based on a connection state of the CC pin (a potential of the CC pin, and the like) when the external device 61 is connected to the receptacle 51, and to execute negotiation of electric power transfer. As used herein, the negotiation is processing of setting an electric power source or an electric power sink, setting electric power transfer, and the like, for example.

The electric power controller 25 executes negotiation of setting a supply of electric power W (refer to FIG. 2) supplied through the Vbus pin for the receptacle 51 functioning as an electric power source, for example. The electric power controller 25 transmits the external device 61 an electric power list of the supply of electric power (thereafter, referred to "supply electric power") W, based on the control of the CPU 12, for example. As used herein, the electric power list is information indicating a combination of a voltage value of a supply voltage Vs (refer to FIG. 2) and a current value of a supply current As (refer to FIG. 2), which can be supplied by the printer 1 as an electric power source. The electric power list can be referred to as a profile. The combination of the voltage value and the current value can also be referred to as a PDO (Power Data Object). For example, in electric power transfer that complies with the USB PD standards, electric power can be supplied from an electric power source to an electric power sink within a range of electric power from 2.5 W (5V, 0.5 A) to 100 W (20V, 5 A). The electric power list is information indicating a combination (PDO) of the voltage value and the current value within the range of electric power, which can be supplied by the printer 1 functioning as an electric power source.

When the receptacle 51 is caused to function as an electric power sink, the electric power controller 25 executes negotiation with respect of reception of electric power via the receptacle 51. The electric power controller 25 requests a combination of a voltage value and a current value that are to be received from the electric power list received from the external device 61 functioning as an electric power source, under control of the CPU 12, for example. When the negotiation is successful, the receptacle 51 receives desired electric power from the external device 61.

As shown in FIG. 1, the electric power controller 25 includes a memory 26. In the memory 26, a program PG is stored. The electric power controller 25 includes a processing circuit such as a CPU, and executes the program PG in the processing circuit, thereby controlling the power supply unit 27, for example. The memory 26 is configured by a combination of a RAM, a ROM, a flash memory and the like, for example.

The power supply unit 27 functions as a power supply for each unit in the printer 1 to supply electric power to each unit. The power supply unit 27 will be described in detail later. The user interface 20 is, for example, a touch panel, and includes a liquid crystal panel, a light source such as LED for irradiating light from a backside of the liquid crystal panel, a touch detection film bonded on a surface of the liquid crystal panel, and the like. The user interface 20 receives an operation on the printer 1 and to output a signal corresponding to an operation input to the CPU 12. The user interface 20 displays information about the printer 1. The user interface 20 changes display contents of the liquid crystal panel, under control of the CPU 12. In the meantime, the user interface 20 may also include operation buttons such as hard keys. The user interface 20 is not limited to the configuration where a display unit and an operation unit are integrated, such as a touch panel, and may also have a configuration where a display unit and an operation unit are separately provided.

The communication unit 24 can enable wired communication and wireless communication. The CPU 12 controls the communication unit 24 to receive a print job and a scan job via wired communication and wireless communication. Thereby, the printer 1 can receive a print job and a scan job via wired communication or wireless communication with a PC, a smartphone and the like, for example. The printer 1 can receive a print job and a scan job via data communication of the USB connection unit 19. The CPU 12 executes printing by the image forming unit 16, based on the received print job. The CPU 12 executes scanning of an image by the image scanning unit 17, based on the received scan job. The CPU 12 receives a print job and a scan job and to execute printing and scanning, based on operation inputs on the user interface 20.

(2. Configuration of Power Supply Unit 27)

Figure 2:
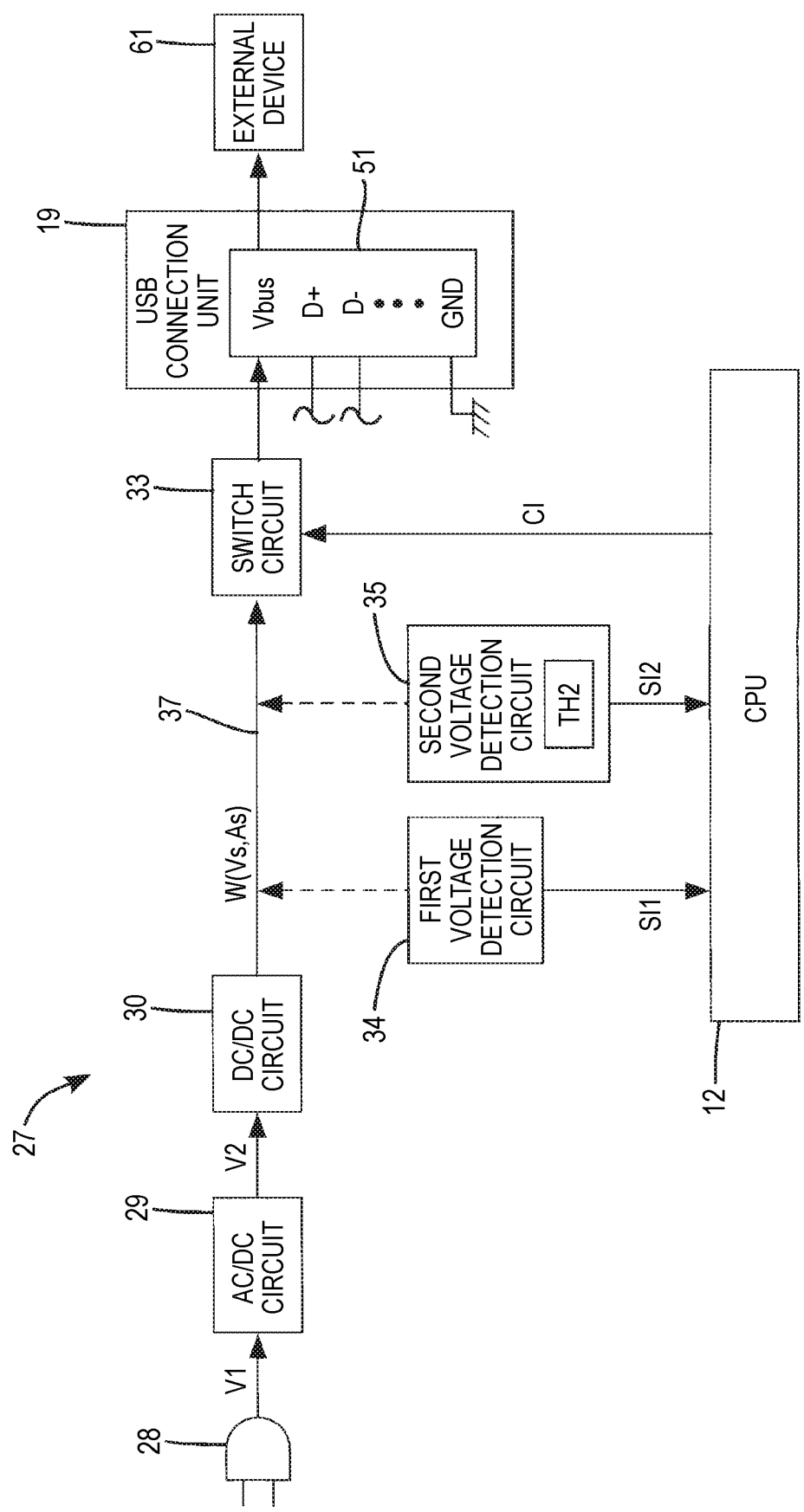
FIG. 2 is a block diagram depicting a configuration of a power supply unit.

Subsequently, the power supply unit 27 is described in detail. FIG. 2 depicts a configuration of the power supply unit 27. As shown in FIGS. 1 and 2, the power supply unit 27 includes a power supply cord 28, an AC/DC circuit 29, a DC/DC circuit 30, a battery 31 (refer to FIG. 1), a switch circuit 33, a first voltage detection circuit 34, and a second voltage detection circuit 35. The AC/DC circuit 29 and the DC/DC circuit 30 function as a power processor. The AC/DC circuit 29 converts an AC voltage V1, which is received from an AC power supply via the power supply cord 28, into a DC voltage V2. A voltage value of the AC voltage V1 is, for example, 100V. A voltage value of the DC voltage V2 is, for example, 25V.

The DC/DC circuit 30 converts the DC voltage V2 supplied from the AC/DC circuit 29 or a DC voltage supplied from the battery 31 (refer to FIG. 1) into a DC voltage of a desired voltage value, and to supply electric power to each unit in the printer 1. Therefore, the printer 1 can be driven by the battery 31 even when the AC power supply is not connected thereto. The battery 31 can be charged by electric power generated from the AC/DC circuit 29 or electric power received from an external device via the USB connection unit 19.

The power supply unit 27 enables to switch electric power lines for connecting the AC/DC circuit 29, the DC/DC circuit 30, the battery 31 and the like, under control of the CPU 12, for example. The CPU 12 controls the power supply unit 27 to switch a power supply device for supplying electric power to each unit in the printer 1, a power supply device for supplying charging electric power to the battery 31, and a power supply device for supplying electric power to an external device via the USB connection unit 19. In the meantime, the subject controlling the power supply unit 27 is not limited to the CPU 12 and may also be the electric power controller 25.

The DC/DC circuit 30 generates the supply electric power W (the supply voltage Vs, the supply current As), which is supplied from the USB connection unit 19 to the external device 61, from the DC voltage V2 and the like. The DC/DC circuit 30 is connected to the switch circuit 33 via an electric power line 37. The switch circuit 33 is connected to the Vbus pin of the receptacle 51 of the USB connection unit 19. In other words, the switch circuit 33 is connected between the DC/DC circuit 30 and the USB connection unit 19.

The switch circuit 33 switches connection between the DC/DC circuit 30 and the USB connection unit 19, based on a control signal CI that is input from the CPU 12. The switch circuit 33 has, for example, a FET (Field effect transistor), and changes a gate voltage of the FET based on the control signal CI, thereby switching an on state where the DC/DC circuit 30 is connected to the USB connection unit 19 and an off state where the DC/DC circuit 30 and the USB connection unit 19 are disconnected. The CPU 12 sets the switch circuit 33 to the on state after activating the power supply unit 27 and sets the switch circuit 33 to the off state when an electric power abnormality is detected, as described above, for example.

The switch circuit 33 is an example of the switch of the present disclosure. In the meantime, the switch of the present disclosure is not limited to the configuration of switching the connection by using the FET, and may also switch the connection by using another transistor such as a bipolar transistor or to switch the connection by turning on or off physically a relay. The switch is not limited to the configuration of connecting or disconnecting the electric power line 37, and may have a variable resistor and may switch the supply of electric power W supplied from the USB connection unit 19 to the external device 61 by reducing the supply electric power W without completely stopping the supply of electric power. The subject controlling the switch circuit 33 is not limited to the CPU 12 and may also be the electric power controller 25.

The first voltage detection circuit 34 outputs, to the CPU 12, a first detection signal SI1 corresponding to a magnitude of the supply voltage Vs that flows through the electric power line 37. The second voltage detection circuit 35 outputs, to the CPU 12, a second detection signal SI2 corresponding to a magnitude of the supply voltage Vs that flows through the electric power line 37. The configurations of the first and second voltage detection circuits 34 and 35 are not particularly limited and may be identical or different from each other.

The configurations of the first and second voltage detection circuits 34 and 35 of the present embodiment are different from each other. The first voltage detection circuit 34 is connected in parallel with the electric power line 37 and outputs information indicating a magnitude of the voltage value of the supply voltage Vs to the CPU 12, as the first detection signal SI1, based on a voltage applied to an internal resistor, for example. The CPU 12 determines an abnormality of the supply electric power W by comparing the voltage value of the supply voltage Vs indicated by the first detection signal SI1 input from the first voltage detection circuit 34 with the first threshold value TH1 read out from the NVRAM 15. Therefore, in determination processing of determining electric power abnormality by using the first threshold value TH1, the CPU 12 executes comparison processing with the first threshold value TH1.

A data format of the first detection signal SI1 is not particularly limited. For example, the first detection signal SI1 may be a bit value indicating the voltage value of the supply voltage Vs as a numerical value. The first detection signal SI1 may be a numerical value indicating stepwise a magnitude of the supply voltage Vs.

As described later, the first threshold value TH1 is a value set based on the combination (POD) selected by the external device 61 in the negotiation, for example. That is, the first threshold value TH1 is an upper limit value set based on the supply electric power W (supply voltage Vs) to be transferred actually. The CPU 12 determines whether the supply voltage Vs of a voltage or higher selected in the negotiation is supplied by comparing the magnitude of the voltage value of the supply voltage Vs indicated by the first detection signal SI1 and the first threshold value TH1. When the supply voltage Vs of a voltage or higher selected in the negotiation is supplied, the CPU 12 sets the switch circuit 33 to the off state to stop the supply of electric power.

The second voltage detection circuit 35 is connected in parallel with the electric power line 37 and compares the magnitude of the voltage value of the supply voltage Vs and a second threshold value TH2, based on a voltage applied to an internal resistor, and to output a result of the comparison to the CPU 12, as the second detection signal SI2, for example. The second threshold value TH2 is, for example, a voltage value corresponding to a maximum value of electric power allowed to be supplied from the USB connection unit 19 or a value based on the voltage value, and a voltage value of 20V or higher is set, for example. The second voltage detection circuit 35 has a comparison circuit which compares the supply voltage Vs with the second threshold value TH2, for example. When the supply voltage Vs is lower than the second threshold value TH2, the second voltage detection circuit 35 outputs the second detection signal SI2 of a low level to the CPU 12, and when the supply voltage Vs is equal to or higher than the second threshold value TH2, the second voltage detection circuit 35 outputs the second detection signal SI2 of a high level to the CPU 12. Therefore, in determination processing of determining an electric power abnormality by using the second threshold value TH2, the second voltage detection circuit 35 executes the comparison processing with the second threshold value TH2.

The configuration of the second voltage detection circuit 35 is not particularly limited. The second voltage detection circuit 35 may also compare the supply voltage Vs with the second threshold value TH2 by software processing of the CPU or the like, without using the hardware such as the comparison circuit. The second voltage detection circuit 35 may output a difference (a positive voltage value or a negative voltage value) between the supply voltage Vs and the second threshold value TH2 to the CPU 12, as the second detection signal SI2.

The CPU 12 determines whether the supply voltage Vs equal to or higher than the maximum value is supplied, based on the second detection signal SI2 input from the second voltage detection circuit 35, for example. When the supply voltage Vs equal to or higher than the maximum value is supplied, the CPU 12 sets the switch circuit 33 to the off state to stop the supply electric power W.

(3. First Threshold Value Decision Processing)

Subsequently, processing of deciding the first threshold value TH1 by the CPU 12 of the present embodiment is described with reference to FIG. 3. When the power supply of the printer 1 becomes on, for example, the CPU 12 executes the control program 41 stored in the ROM 14 to activate the system of the printer 1 and then starts first threshold value decision processing shown in FIG. 3. When new negotiation starts as the first threshold value decision processing is executed, the CPU 12 sets the first threshold value TH1, based on a result of the negotiation.

The flowchart of the specification indicates processing of the CPU 12 according to commands described in the program. That is, in descriptions below, the processing "determination", "decision", "control" and the like indicates the processing of the CPU 12. The processing that is executed by the CPU 12 includes hardware control. The first threshold value decision processing shown in FIG. 3 may also be executed by a unit other than the CPU 12. For example, the electric power controller 25 may execute the program PG to execute the first threshold value decision processing shown in FIG. 3.

First, in step (hereinbelow, simply denoted as "S") 11 in FIG. 3, the CPU 12 determines whether new negotiation with the external device 61 has started. For example, when the external device 61 is connected to the USB connection unit 19, the CPU 12 starts new negotiation with the external device 61. For example, when the external device 61 is connected to the USB connection unit 19, the CPU 12 requests device information from the connected external device 61 by a plug and play (PnP) function.

As used herein, the device information is USB device information such as a vendor ID, a product ID and a USB device class ID of a manufacturer of the external device 61, for example. After acquiring the device information, the CPU 12 controls the electric power controller 25 to execute negotiation with the external device 61, thereby setting an electric power role (an electric power source or an electric power sink) and deciding electric power transferred to and from the external device 61. As described above, in the printer 1 of the present embodiment, for example, an electric power role is randomly decided upon new connection, based on the potential state of the CC pin of the receptacle 51. The printer 1 may become an electric power source by the random decision of the electric power role upon new connection or may become an electric power source by transmitting a swap request for swapping an electric power role after becoming once an electric power sink. In descriptions below, a case where the printer 1 is the electric power source and supplies the supply electric power W to the external device 61 is described.

The CPU 12 repeatedly executes the determination processing of S11 until it is determined that new negotiation has started (S11: NO). For example, when the external device 61 is connected, the printer functions as an electric power source and new negotiation with the external device 61 for deciding the supply electric power W starts, the CPU 12 makes an affirmative determination in S11 (S11: YES), and executes S13. In the meantime, the condition for determining that new negotiation has started is not limited to the case where the new external device 61 is connected. For example, when negotiation with the connected external device 61 for changing the supply electric power W is executed, the CPU 12 may determine that new negotiation has started. Thereby, even when negotiation with the connected external device 61 is newly started, the CPU 12 can execute processing of S13 and thereafter to update the first threshold value TH1.

In S13, the CPU 12 executes negotiation with the external device 61, and decides the supply electric power W. The CPU 12 transmits the electric power list of the supply electric power W to the external device 61 which is an electric power sink. The CPU 12 controls the electric power controller 25 to transmit the electric power list to the external device 61. The external device 61 selects, from the received electric power list, a combination (the supply voltage Vs, the supply current As) of electric power to be received, and requests the same from the printer 1. The CPU 12 decides the supply electric power W (the supply voltage Vs, the supply current As), based on the information received from the external device 61.

After executing S13, the CPU 12 executes S15. In S15, the CPU 12 decides the first threshold value TH1, based on the supply voltage Vs decided in S13. The CPU 12 decides, as the first threshold value TH1, the same value as the voltage value of the supply voltage Vs, for example. In this case, the voltage value of the supply voltage Vs that is actually supplied is set as the upper limit value. The CPU 12 stores the decided first threshold value TH1 in the NVRAM 15. In the meantime, the first threshold value TH1 is not limited to the same value as the voltage value of the supply voltage Vs. For example, the CPU 12 may set, as the first threshold value TH1, a voltage value higher than the voltage value of the supply voltage Vs by several V, i.e., a value having a margin of several V. The CPU 12 may set, as the first threshold value TH1, the maximum voltage value (20V or the like) of the USB PD standards or a voltage value higher than the maximum voltage value by several V. When supplying the electric power to a plurality of the external devices 61, the CPU 12 may set the first threshold value TH1 for each of the external devices 61 or each of the electric power lines 37.

After executing S15, the CPU 12 executes S17. The CPU 12 starts processing of supplying the supply electric power W decided in S13 to the external device 61. Thereby, the printer 1 causes the receptacle 51 to function as an electric power source, and starts the supply of electric power to the external device 61. When the CPU 12 executes S17, the processing shown in FIG. 3 is over.

(4. Electric Power Supply Restriction Processing)

Subsequently, electric power supply restriction processing of restricting the supply electric power W, which is executed by the CPU 12 of the present embodiment, is described with reference to FIGS. 4 and 5. When the CPU 12 activates the power supply unit 27 and is thus in a state where electric power can be supplied, for example, the CPU 12 starts the electric power supply restriction processing shown in FIGS. 4 and 5. The CPU 12 executes the electric power supply restriction processing to restrict the supply of electric power, in correspondence to detection of an electric power abnormality. In the meantime, the electric power supply restriction processing shown in FIGS. 4 and 5 may also be executed by a device other than the CPU 12. For example, the electric power controller 25 may execute the program PG to execute the electric power supply restriction processing.

Figure 4:
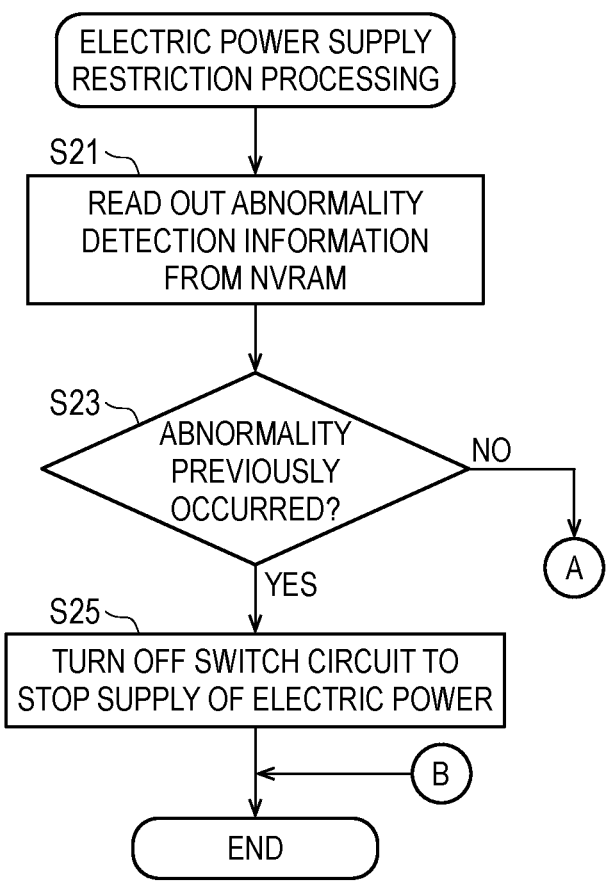
FIG. 4 is a flowchart depicting contents of electric power supply restriction processing.

First, in S21 of FIG. 4, the CPU 12 reads out the abnormality detection information 45 from the NVRAM 15. After executing S21, the CPU 12 determines whether an electric power abnormality previously occurred, based on the abnormality detection information 45 (S23). As described later, when the electric power abnormality is detected, the CPU 12 stores information about the detected electric power abnormality in the abnormality detection information 45 (S35 in FIG. 5).

In a case where the information indicating that the electric power abnormality has been detected is stored in the abnormality detection information 45, for example, the CPU 12 makes an affirmative determination in S23 (S23: YES), and executes S25. The CPU 12 sets the switch circuit 33 to the off state by the control signal CI, thereby stopping the supply of electric power to the external device 61 (S25). Thereby, if the electric power abnormality occurred even once, it is possible to stop the supply of electric power next time and thereafter, thereby suppressing recurrence of the electric power abnormality. For example, when the power supply unit 27 or the external device 61 is out of order and the supply of electric power is stopped, if a user restarts the printer 1 with the external device 61 being connected thereto without noticing the failure, the processing shown in FIG. 3 may start upon activation of the power supply unit 27 and the supply of electric power to the external device 61 may start while the failure occurs. Therefore, in a case where the information indicating that the electric power abnormality has been detected is stored in the abnormality detection information 45, the CPU 12 of the present embodiment sets the switch circuit 33 to the off state upon activation of the power supply unit 27, thereby forcibly stopping the supply of electric power. Thereby, it is possible to suppress the supply of electric power from being resumed while the failure occurs.

Figure 5:
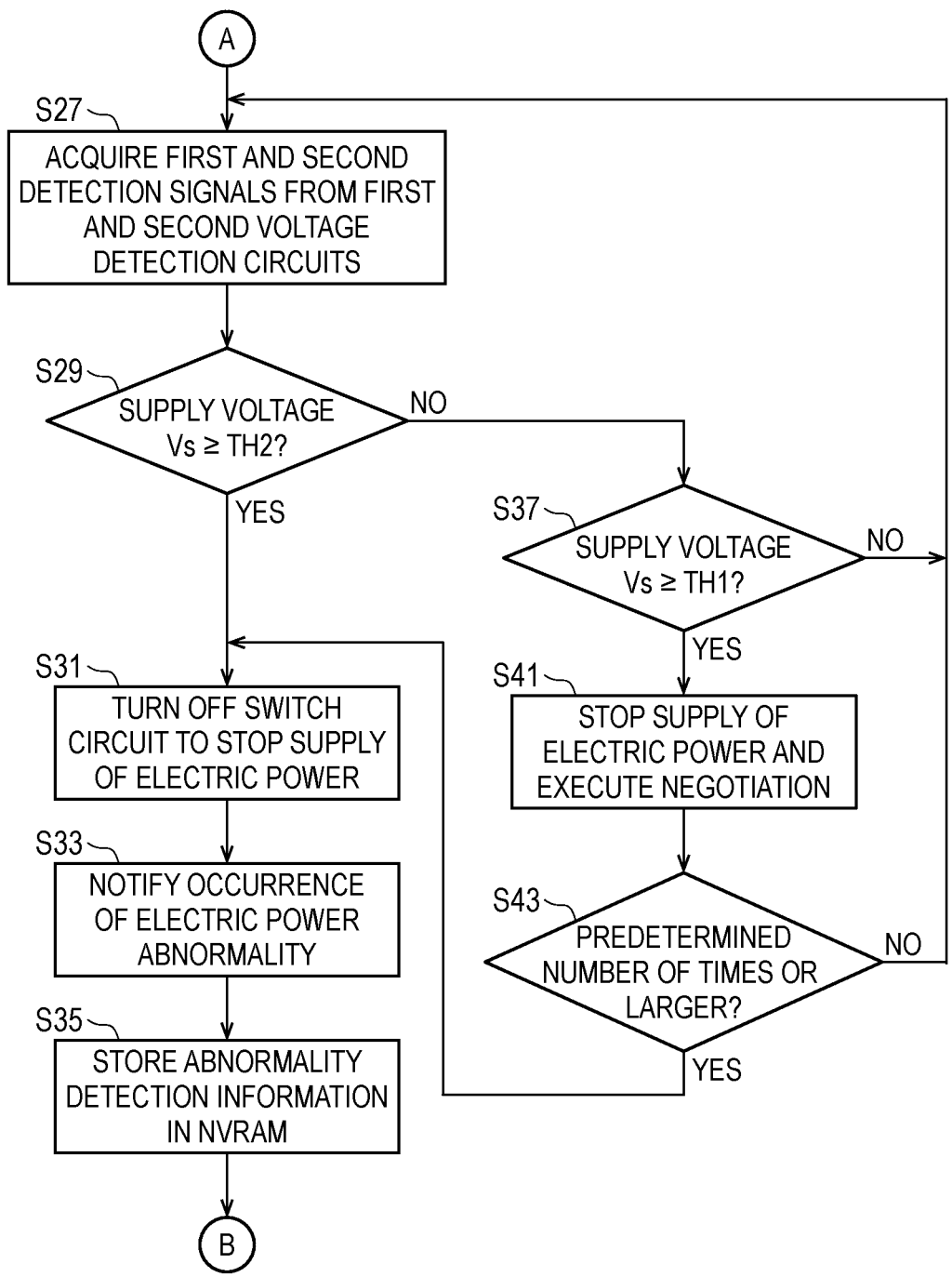
FIG. 5 is a flowchart depicting contents of the electric power supply restriction processing.

When the CPU 12 executes S25, the electric power supply restriction processing shown in FIGS. 4 and 5 is over. In the meantime, when ending the electric power supply restriction processing, the CPU 12 may execute processing of stopping the power supply unit 27 or the printer 1. Thereby, it is possible to safely stop the printer 1 when a failure or the like occurs.

The condition for starting the electric power supply restriction processing shown in FIGS. 4 and 5 is not limited to the activation of the power supply unit 27. For example, the CPU 12 may also start the electric power supply restriction processing at the time when the supply of electric power to the external device 61 starts. For example, the CPU 12 may also execute the electric power supply restriction processing shown in FIGS. 4 and 5 at the time when new negotiation starts and the first threshold value decision processing shown in FIG. 3 starts. Thereby, after the supply of electric power is stopped in S25, when the user reconnects the external device 61 without noticing the electric power abnormality, it is possible to suppress the supply of electric power from being resumed while the failure occurs.

In a case where the printer 1 includes a plurality of the receptacles 51 or in a case where a plurality of the external devices 61 is connected, the CPU 12 may set only the switch circuit 33 connected to the receptacle 51 or the external device 61 in which the electric power abnormality is detected to the off state. The CPU 12 may store information of the receptacle 51 or the device ID of the external device 61 in which the electric power abnormality is detected in the abnormality detection information 45, thereby setting only the switch circuit 33 connected to the receptacle 51 or the external device 61 in which the electric power abnormality is detected to the off state, based on the abnormality detection information 45.

The CPU 12 may receive editing of the abnormality detection information 45 or initialization of data. Thereby, when a failed component is replaced, for example, the abnormality information stored in the abnormality detection information 45 is deleted to suppress the affirmative determination in S23 upon next activation of the power supply unit 27, i.e., the stop of the supply of electric power.

On the other hand, in a case where the information indicating the abnormality is not stored in the abnormality detection information 45, the CPU 12 makes a negative determination in S23 (S23: NO), and executes S27 in FIG. 5. In S27, the CPU 12 acquires the first and second detection signals SI1 and SI2 from the first and second voltage detection circuits 34 and 35.

After executing S27, the CPU 12 executes S29. The CPU 12 determines whether the supply voltage Vs is equal to or higher than the second threshold value TH2. Thereby, the CPU 12 can determine whether the supply electric power W is equal to or higher than the maximum value of electric power allowed to be supplied from the USB connection unit 19, for example (S29). As described above, when the supply voltage Vs is lower than the second threshold value TH2, the second voltage detection circuit 35 outputs the second detection signal SI2 of a low level to the CPU 12, and when the supply voltage Vs is equal to or higher than the second threshold value TH2, the second voltage detection circuit 35 outputs the second detection signal SI2 of a high level to the CPU 12. When the second detection signal SI2 acquired in S27 is the second detection signal SI2 of a low level, the CPU 12 makes a negative determination in S29 (S29: NO), and executes S37. When the second detection signal SI2 acquired in S27 is the second detection signal SI2 of a high level, the CPU 12 makes an affirmative determination in S29 (S29: YES), and executes S31.

When S31 is executed, the supply voltage Vs becomes equal to or higher than the second threshold value TH2 and the supply electric power W becomes equal to or higher than the maximum value, for example. There is a possibility that the supply electric power W is equal to or higher than electric power allowed to transfer through the electric power line 37, the USB connection unit 19 and the like. For this reason, the CPU 12 sets the switch circuit 33 to the off state, thereby stopping the supply of electric power from the power supply unit 27 to the external device 61, similar to S25 (S31). Thereby, when the electric power abnormality where the supply electric power W is equal to or higher than the maximum value occurs, the supply of electric power can be stopped. In the meantime, the printer 1 may also control the AC/DC circuit 29 or the DC/DC circuit 30 so that the supply electric power W is lower than the maximum value, for example, without completely stopping the supply of electric power. That is, in the present disclosure, the restriction processing of the supply electric power W is not limited to the processing of completely stopping the supply and is a concept including processing of reducing the supply.

Figure 6:
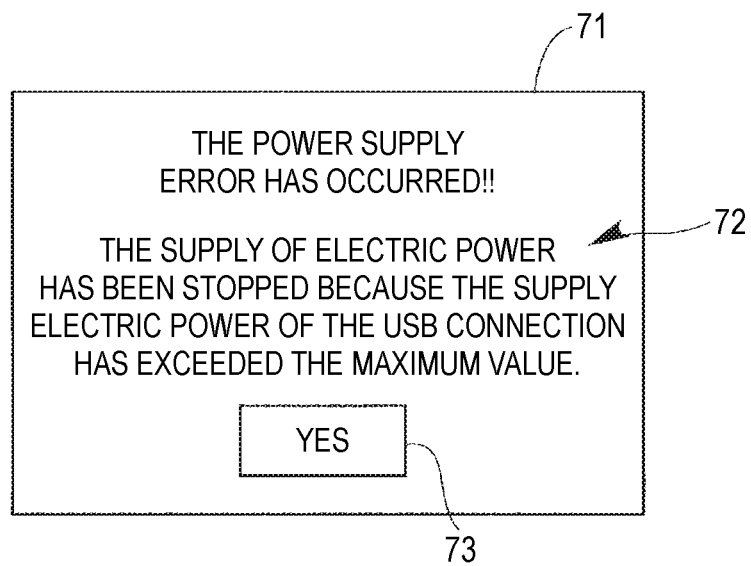
FIG. 6 depicts an error screen that is displayed when a supply voltage is equal to or higher than a second threshold value.

After executing S31, the CPU 12 executes S33. In S33, the CPU 12 executes processing of notifying that the electric power abnormality has occurred. For example, the CPU 12 displays an error screen 71 shown in FIG. 6 on the touch panel of the user interface 20. As shown in FIG. 6, the CPU 12 displays, on the user interface 20, a message 72 indicating that the supply electric power W is equal to or larger than the maximum value, and an OK button 73. The CPU 12 keeps displaying the error screen 71 until a touch operation on the OK button 73 is detected, for example. Thereby, it is possible to urge the user to check the failure of the power supply unit 27, and the like.

After executing S33, the CPU 12 executes S35. In S35, the CPU 12 stores the information indicating that the electric power abnormality has occurred, as the abnormality detection information 45 in the NVRAM 15. The CPU 12 stores, as the abnormality detection information 45, detection of the electric power abnormality at the second threshold value TH2, date and time of the detection of the electric power abnormality, the device ID of the external device 61 and the like, for example. Thereby, upon next activation of the power supply unit 27, the CPU 12 can set the switch circuit 33 to the off state, based on the abnormality detection information 45, thereby stopping the supply of electric power (S25). After executing S35, the CPU 12 ends the processing shown in FIGS. 4 and 5.

On the other hand, when a determination result in S29 is negative (S29: NO), the CPU 12 executes S37. In S37, the CPU 12 determines whether the supply voltage Vs is equal to or higher than the first threshold value TH1. The first threshold value TH1 is a value set in S15 of FIG. 3, and is, for example, the voltage value of the supply voltage Vs decided in the negotiation. The CPU 12 can determine whether the supply voltage Vs equal to or higher than the voltage decided in the negotiation is supplied by comparing the magnitude of the voltage value of the supply voltage Vs indicated by the first detection signal SI1 of the first voltage detection circuit 34 and the first threshold value TH1.

When the voltage value of the supply voltage Vs indicated by the first detection signal SI1 is smaller than the first threshold value TH1, the CPU 12 makes a negative determination in S37 (S37: NO), and again executes the processing of S27 and thereafter. Thereby, in the state where the electric power is supplied to the external device 61, the CPU 12 repeatedly acquires the first and second detection signals SI1 and SI2 from the first and second voltage detection circuits 34 and 35, and determines the electric power abnormality, based on the first and second threshold values TH1 and TH2.

On the other hand, when it is determined that the voltage value of the supply voltage Vs is equal to or greater than the first threshold value TH1 (S37: YES), the CPU 12 sets the switch circuit 33 to the off state, thereby stopping the supply of electric power to the external device 61 (S41). After stopping the supply of electric power, the CPU 12 executes negotiation with the external device 61 (S41). Even in the case where the supply voltage Vs is equal to or higher than the first threshold value TH1, when the supply voltage Vs is lower than the second threshold value TH2 which is the maximum value, the supply of electric power may be normally resumed if the occurred electric power abnormality is temporary. Therefore, the CPU 12 sets the switch circuit 33 to the off state to once stop the supply of electric power and then again sets the switch circuit 33 to the on state to execute negotiation with the external device 61. The CPU 12 starts the supply of the supply electric power W decided in the negotiation.

Before setting the switch circuit 33 to the off state in S41, the CPU 12 may transmit a reset signal, which notifies that the supply of electric power will be stopped, to the external device 61 via USB PD communication. The CPU 12 may not set the switch circuit 33 to the off state in S41. For example, the CPU 12 may reduce (restrict) once the supply electric power W to minimum electric power allowed to be supplied (for example, 2.5 W (5V, 0.5 A)), and then execute the negotiation. The supply electric power W which is again supplied in S41 becomes the same electric power as the electric power before the stop when the same electric power is requested from the external device 61 and becomes electric power different from the electric power before the stop when a different electric power is requested from the external device 61. The CPU 12 may notify the external device 61 of only the supply electric power W (a combination of the supply voltage Vs and the supply current As), which is the same as the electric power before the stop, as the electric power list. Thereby, the voltage supply is resumed only when the external device 61 requests the same supply electric power W as the electric power before the stop. The CPU 12 may execute the processing of S31 and thereafter when the negotiation fails and the supply of electric power cannot be resumed.

After executing S41, the CPU 12 executes S43. In S43, the CPU 12 determines whether the number of execution times of S41 is equal to or larger than a predetermined number of times. Even when the supply voltage Vs is lower than the second threshold value TH2, if a situation where the supply voltage Vs is equal to or higher than the first threshold value TH1 occurs more than once, there is a high possibility that the external device 61 is out of order. Therefore, when the processing of S41 is repeated more than once, the CPU 12 ends the processing shown in FIGS. 4 and 5. For this reason, the predetermined number of times in S43 is an upper limit of the number of times that S41 is executed to again try the negotiation, and for example, about two to ten times may be set. As the predetermined number of times, a different value may be used, depending on a type of the external device 61 (a type of the device ID), for example.

Figure 7:
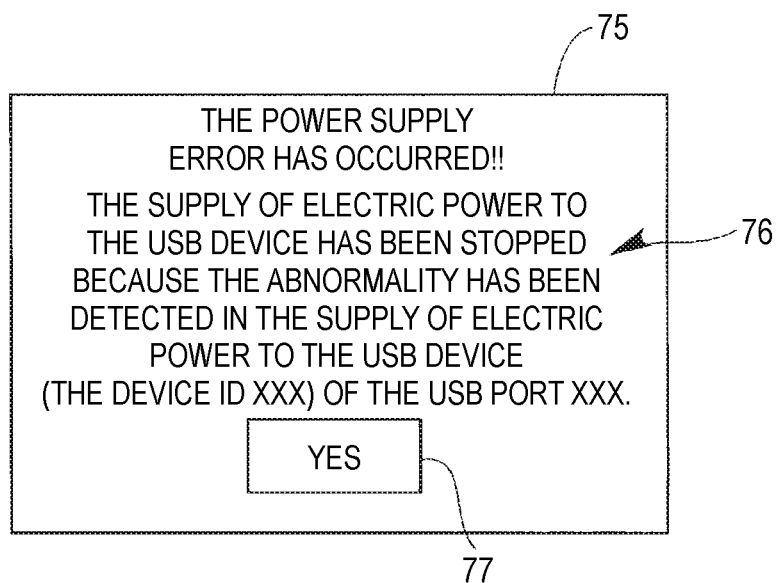
FIG. 7 depicts an error screen that is displayed when the supply voltage is equal to or higher than a first threshold value.

When it is determined that the number of execution times of S41 is smaller than the predetermined number of times (S43: NO), the CPU 12 again executes the processing of S27 and thereafter, and executes the determination for the supply voltage Vs by using the first and second threshold values TH1 and TH2. When it is determined that the number of execution times of S41 is equal to or larger than the predetermined number of times (S43: YES), the CPU 12 executes the processing of S31 and thereafter. The CPU 12 sets the switch circuit 33 to the off state to stop the supply of electric power (S31), and notifies that the electric power abnormality has occurred (S33). For example, the CPU 12 displays, on the user interface 20, an error screen 75 shown in FIG. 7. As shown in FIG. 7, for example, the CPU 12 displays, on the user interface 20, a message 76 including information about the USB port (receptacle 51) in which the electric power abnormality has been detected, information about the external device 61, characters indicating that the supply of electric power to the external device 61 has been stopped, and the like. The CPU 12 keeps displaying the error screen 75 until a touch operation on an OK button 77 displayed on the error screen 75 is detected. Thereby, it is possible to urge the user to check the failure of the external device 61 and the like. When the user checks the failure and determines that there is no abnormality, the user can keep using the printer 1 by initializing the abnormality detection information 45 and the like.

After executing S33, the CPU 12 stores the abnormality detection information 45 in the NVRAM 15 (S35). The CPU 12 stores, in the abnormality detection information 45, detection of the electric power abnormality at the first threshold value TH1, date and time of the detection of the electric power abnormality, the device ID of the external device 61 in which the electric power abnormality has been detected, and the like, for example. Thereby, upon next activation of the power supply unit 27, the CPU 12 can stop the supply of electric power to the external device 61 in which the electric power abnormality has been detected, based on the device ID of the abnormality detection information 45 (S25). When the external device 61 in which the electric power abnormality repeatedly occurred is again connected, the supply of electric power to the external device 61 can be stopped. In this way, the CPU 12 of the present embodiment can restrict the supply electric power W by using the first and second voltage detection circuits 34 and 35.

For reference, the printer 1 is an example of the information processing apparatus. The CPU 12 is an example of the controller. The NVRAM 15 is an example of the storage device. The USB connection unit 19 is an example of the interface. The AC/DC circuit 29 and the DC/DC circuit 30 are examples of the power supply. The switch circuit 33 is an example of the switch. The first voltage detection circuit 34 and the second voltage detection circuit 35 are examples of the first and second detectors. S29, S31 and S37 are examples of the restriction process.

(5. Effects)

According to the embodiment, following effects are achieved.

(1) When the detection value of at least one of the first voltage detection circuit 34 and the second voltage detection circuit 35 is equal to or greater than the threshold value (the first threshold value TH1, the second threshold value TH2) (S29: YES, S37: YES), the CPU 12 of the printer 1 of the present embodiment executes the processing (an example of the restriction processing) of S31 of controlling the switch circuit 33 to restrict the supply electric power W supplied from the USB connection unit 19 to an outside.

According to this configuration, the two detectors of the first and second voltage detection circuits 34 and 35 are connected to one electric power line 37 for monitoring the supply voltage Vs. When the detection value of at least one of the first and second voltage detection circuits 34 and 35 becomes equal to or greater than the threshold value (the first threshold value TH1, the second threshold value TH2), the CPU 12 controls the switch circuit 33 to restrict the supply electric power W supplied to the outside. Thereby, even if one of the first and second voltage detection circuits 34 and 35 is out of order, it is possible to monitor the voltage value on the electric power line 37 by the other detector. Therefore, it is possible to restrict the supply electric power W with more reliability when overvoltage occurs.

(2) When it is determined in the processing of S37 that the detection value of the first voltage detection circuit 34 is equal to or greater than the first threshold value TH1 (S37: YES), the CPU 12 controls the switch circuit 33 to restrict the supply electric power W (S31). When it is determined in the processing of S29 that the detection value of the second voltage detection circuit 35 is equal to or greater than the second threshold value TH2 (S29: YES), the CPU 12 controls the switch circuit 33 to restrict the supply electric power W (S31). According to this configuration, the CPU 12 can change each of the first and second threshold values TH1 and TH2 to individually change the conditions under which each of the first and second voltage detection circuits 34 and 35 executes the restriction processing.

(3) The first threshold value TH1 may be the same value as the second threshold value TH2. According to this configuration, the threshold values of the first voltage detection circuit 34 and the second voltage detection circuit 35 are made to be the same, so that it is possible to duplicate the detection mechanism by connecting the two detectors, which execute the restriction processing under the same condition, to one electric power line 37.

(4) The first threshold value TH1 may be a value different from the second threshold value TH2. According to this configuration, desired values different from each other are set for the first threshold value TH1 and the second threshold value TH2. Thereby, when the electric power abnormality is detected by the first voltage detection circuit 34 and when the electric power abnormality is detected by the second voltage detection circuit 35, it is possible to execute the control corresponding to each threshold value.

(5) The CPU 12 executes the processing example of the negotiation processing) of S13 of executing negotiation with the external device 61 connected to the USB connection unit 19 for deciding the supply electric power W supplied to the external device 61. The first threshold value TH1 may also be a value that is set based on the supply electric power W decided in the processing of S13. The second threshold value TH2 may also be a predetermined fixed value.

According to this configuration, a value based on the supply electric power W decided in the negotiation is set as the first threshold value TH1. The first threshold value TH1 suitable for the supply electric power W which is actually supplied to the external device 61 can be set as appropriate. Thereby, it is possible to detect the electric power abnormality where the supply electric power W equal to or larger than electric power requested by the external device 61 is supplied and to restrict the supply electric power W by using the first threshold value TH1. When the supply electric power W exceeds a predetermined upper limit value, it is possible to restrict the supply electric power W by using a fixed value as the second threshold value TH2.

(6) The second threshold value TH2 may be a value that is equal to or larger than the first threshold value TH1 and is based on the maximum value of electric power allowed to be supplied from the USB connection unit 19. According to this configuration, when the supply electric power W equal to or larger than the maximum value is supplied, it is possible to restrict the supply electric power W by using the second threshold value TH2.

(7) When it is determined in the processing of S37 that the detection value of the first voltage detection circuit 34 is equal to or greater than the first threshold value TH1, the CPU 12 stops the supply of electric power from the USB connection unit 19 to the external device 61 (S41) and then executes the negotiation with the external device 61 for deciding the supply electric power W supplied to the external device 61, after the stop (S41). According to this configuration, when the supply electric power W equal to or larger than electric power requested by the external device 61 in the negotiation is supplied, the CPU once stops the supply of electric power and again executes the negotiation. Thereby, when the temporary electric power abnormality occurs, it is possible to resume the supply of electric power after stopping once the supply.

(8) The first voltage detection circuit 34 outputs the first detection signal SI1 indicating the detection value to the CPU 12. The CPU 12 executes the processing of S37 (an example of the determination processing) of determining whether the detection value indicated by the first detection signal SI1 is equal to or greater than the first threshold value TH1. The CPU 12 executes the processing of S31, based on the result of the processing of S37.

According to this configuration, the CPU 12 can input the first detection signal SI1 from the first voltage detection circuit 34 to acquire an actually measured value of the voltage value by the detection value that is indicated by the first detection signal SI1. Even when the first threshold value TH1 is changed every negotiation, it is possible to appropriately determine a magnitude relation with the first threshold value TH1, based on the detection value acquired from the first detection signal SI1.

(9) When it is determined in the processing of S29 that the detection value of the second voltage detection circuit 35 is equal to or greater than the second threshold value TH2, the CPU 12 stops the supply of electric power from the USB connection unit 19 to the external device 61. According to this configuration, when the detection value exceeds the second threshold value TH2 that is a fixed value, it is possible to stop the supply of electric power.

(10) The second voltage detection circuit 35 outputs, to the CPU 12, a determination result as to whether the detection value of the second voltage detection circuit 35 is equal to or greater than the second threshold value TH2, as the second detection signal SI2. The CPU 12 executes the processing of S31, based on the second detection signal SI2.

According to this configuration, the detection value and the second threshold value TH2 are determined on the second voltage detection circuit 35-side, and a determination result is output to the CPU 12. Since it is not necessary for the CPU 12 to compare the detection value and the second threshold value TH2, the CPU 12 can control the switch circuit 33 more rapidly. That is, when the electric power abnormality occurs, it is possible to restrict the supply electric power W more rapidly. In particular, the comparison with the second threshold value TH2 is executed in the second voltage detection circuit 35 by the hardware processing using the second threshold value TH2 that is a fixed value, so that it is possible to restrict the supply electric power W more rapidly.

(11) When the detection value of at least one of the first and second voltage detection circuits 34 and 35 exceeds the threshold value, the CPU 12 executes the processing of S33 (an example of the notification processing) of notifying that the detection value exceeds the threshold value. According to this configuration, the user can execute the appropriate measure such as a check on operations of the power supply unit 27 and the external device 61 by checking the notification contents.

(12) When the detection value of at least one of the first and second voltage detection circuits 34 and 35 exceeds the threshold value, the CPU 12 executes the processing of S35 (an example of the storing processing) of storing the abnormality detection information 45, which indicates that the detection value exceeds the threshold value, in the NVRAM 15. According to this configuration, it is possible to leave the occurrence of the electric power abnormality in the NVRAM 15, as the abnormality detection information 45.

(13) Upon the activation of the power supply unit 27, the CPU 12 executes the processing of S23 (an example of the storing determination processing) of determining whether the abnormality detection information 45, which indicates that the detection value exceeds the threshold value, is stored in the NVRAM 15, and the processing of S25 (an example of the second restriction processing) of restricting the supply electric power W supplied from the USB connection unit 19 to the outside, when it is determined in the processing of S23 that the abnormality detection information 45, which indicates that the detection value exceeds the threshold value, is stored in the NVRAM 15 (S23: YES).

According to this configuration, when the electric power abnormality occurred upon previous activation of the power supply unit 27 and the abnormality detection information 45, which indicates that the detection value exceeds the threshold value, is stored in the NVRAM 15, the supply electric power W is restricted upon next activation of the power supply unit 27. Thereby, it is possible to prevent the electric power abnormality from recurring.

(14) The USB connection unit 19 is a USB interface. According to this configuration, it is possible to restrict the supply electric power W with more reliability in a case where the electric power abnormality occurs, in the information processing apparatus which supplies the electric power to the external device 61 via the USB interface.

(15) The printer 1 includes the image forming unit 16 which forms an image based on image data, and the image scanning unit 17 which scans an image of a document. According to this configuration, when the electric power abnormality occurs, the supply electric power W is restricted, so that it is possible to protect more securely the expensive electronic devices such as the image forming unit 16 and the image scanning unit 17.

(6. Modified Embodiments)

The present disclosure is not limited to the above embodiment, and can be diversely improved and modified without departing from the gist of the present disclosure.

Figure 3:
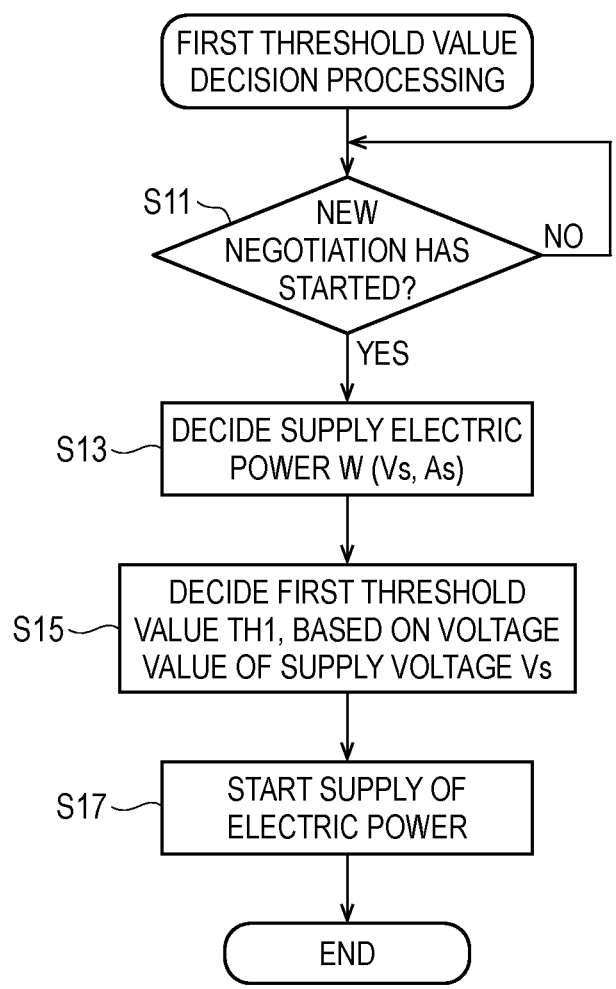
FIG. 3 is a flowchart depicting contents of first threshold value decision processing.

For example, in the above embodiment, the CPU 12 executes the controls shown in FIGS. 3 to 5. However, another device may also execute the controls. For example, the electric power controller 25 may execute the program PG of the memory 26 to execute the controls shown in FIGS. 3 to 5. In this case, the electric power controller 25 is an example of the controller of the present disclosure. The program PG is an example of the program of the present disclosure.

Figure 8:
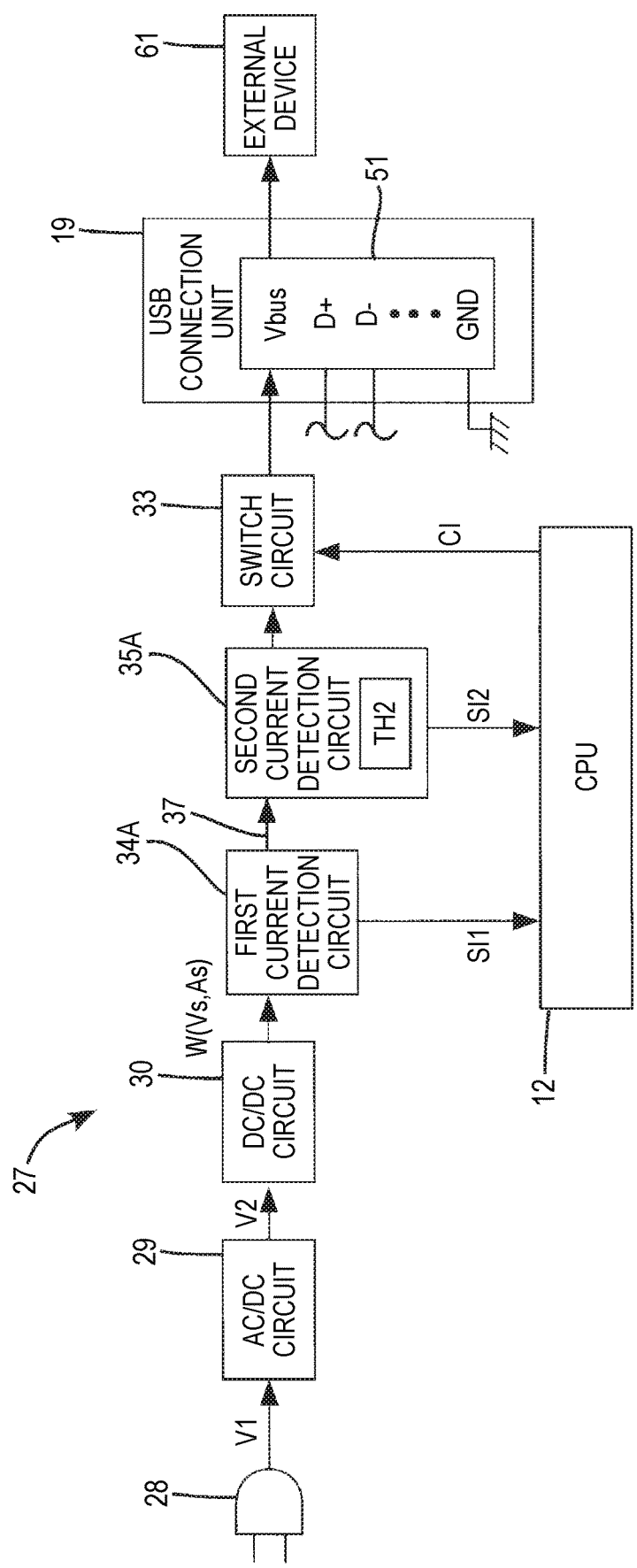
FIG. 8 is a block diagram depicting a configuration of the power supply unit of another example.

The configuration of the power supply unit 27 shown in FIG. 2 is an example. For example, in the above embodiment, as the detector, the voltage detection circuit (the first voltage detection circuit 34, the second voltage detection circuit 35) is provided. However, a current detection circuit detecting current may also be provided as the detector. For example, as shown in FIG. 8, the power supply unit 27 may include a first current detection circuit 34A and a second current detection circuit 35A which each outputs a detection signal based on a current value.

For example, the first current detection circuit 34A is connected in series with the electric power line 37 and outputs information indicating a magnitude of a current value of the supply current As to the CPU 12, as the first detection signal SI1, based on current flowing through an internal resistor. The second current detection circuit 35A is connected in series with the electric power line 37 and compares the magnitude of the current value of the supply current As with the second threshold value TH2, based on the current flowing through an internal resistor, and to output a result of the comparison to the CPU 12, as the second detection signal SI2, for example. The second threshold value TH2 is a value based on a maximum value of current allowed to be supplied from the USB connection unit 19, for example, and a current value of 5 A or higher is set.

Therefore, the first current detection circuit 34A and the second current detection circuit 35A output the first and second detection signals SI1 and SI2 corresponding to the current value flowing through the electric power line 37. Similar to the above embodiment, the CPU 12 may determine the electric power abnormality, based on the current value. Specifically, the CPU 12 may compare the current value indicated by the first detection signal SI1 and the first threshold value TH1, and may determine the electric power abnormality when the supply current As is equal to or higher than the maximum current value (5 A or the like) of the USB PD standards or is equal to or higher than the maximum current value allowed to be transmitted through the electric power line 37. When the second detection signal SI2 of a high level is input, the CPU 12 may determine that the electric power abnormality is detected, and set the switch circuit 33 to the off state to disconnect the electric power line 37 and to stop the supply of electric power. In the meantime, the power supply unit 27 may include the first current detection circuit 34A and the second current detection circuit 35A having the same configuration.

Figure 9:
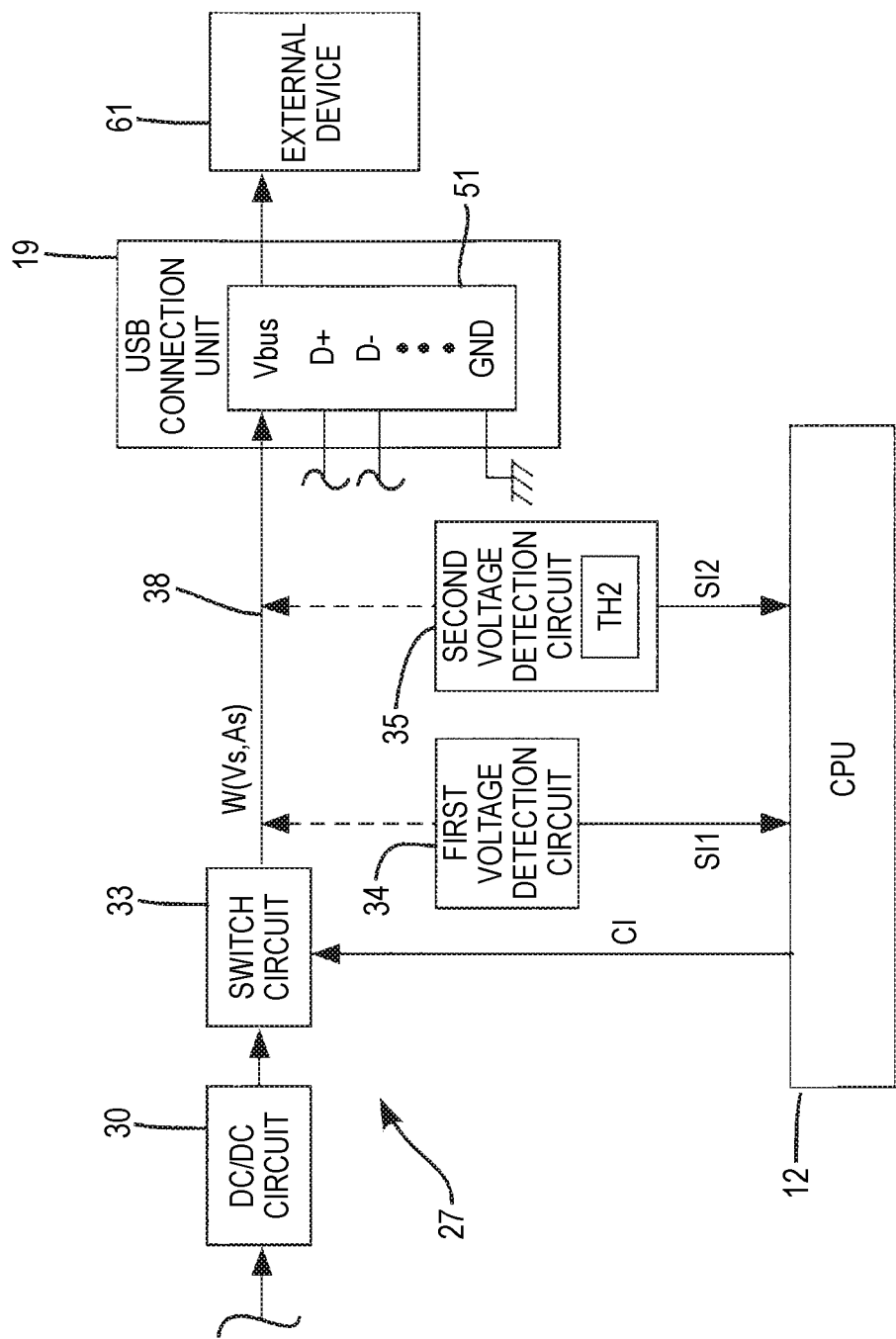
FIG. 9 is a block diagram depicting a configuration of the power supply unit of another example.

The position in which the detectors such as the voltage detection circuit and the current detection circuit are connected can be changed as appropriate. For example, as shown in FIG. 9, the first voltage detection circuit 34 and the second voltage detection circuit 35 may be connected to an electric power line 38 for connecting the switch circuit 33 and the USB connection unit 19 each other. That is, the detectors may also be connected to the USB connection unit 19-side (low side) of the switch circuit 33.

Figure 10:
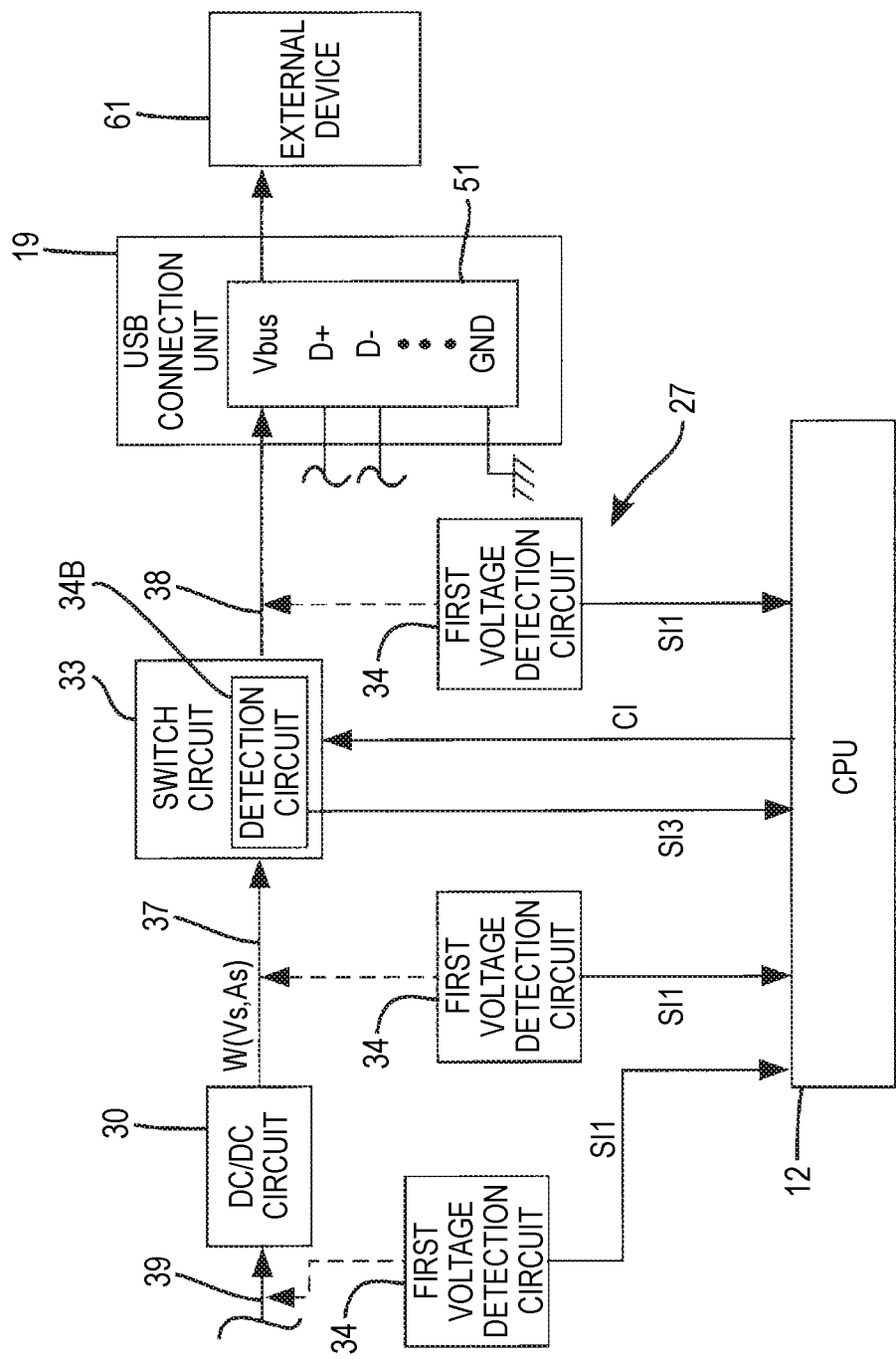
FIG. 10 is a block diagram depicting a configuration of the power supply unit of another example.

Alternatively, as shown in FIG. 10, the detectors may also be each connected to each of a high side and a low side of the switch circuit 33. For example, as shown in FIG. 10, the three first voltage detection circuits 34 having the same configuration may be connected. For example, the first voltage detection circuits 34 may be each connected to the electric power line 37 on a high side of the switch circuit 33, the electric power line 38 on a low side of the switch circuit 33, and an electric power line 39 on a high side of the DC/DC circuit 30. In this case, the first threshold value TH1 for detecting the electric power abnormality may be set different for each of the electric power lines 37, 38 and 39. For example, the detectors may be arranged on the power supply cord 28-side (high side) of the AC/DC circuit 29 shown in FIG. 2. Therefore, the detectors of the present disclosure can be connected to the diverse electric power lines from the power supply cord 28 (AC power supply) to the USB connection unit 19 (the interface with the external device 61). Each of the detectors may be the current detection circuit or the voltage detection circuit having the same or different configuration.

The power supply unit 27 may include a detector which detects a voltage and a detector which detects a current. For example, the power supply unit 27 may include the first voltage detection circuit 34 (refer to FIG. 2) and the first current detection circuit 34A (refer to FIG. 8).

As shown in the switch circuit 33 of FIG. 10, a detection circuit 34B detecting voltage or current may be provided in the switch circuit 33. The CPU 12 may also determine the electric power abnormality, based on a third detection signal SI3 input from the detection circuit 34B in the switch circuit 33.

The CPU 12 may change the second threshold value TH2 in the second voltage detection circuit 35 and to change a range for determining the electric power abnormality. For example, the CPU 12 may output the control signal to the second voltage detection circuit 35, based on the value of the supply voltage Vs or the supply current As, thereby changing the second threshold value TH2. The CPU 12 may execute the determination by using the second threshold value TH2. The first voltage detection circuit 34 or the first current detection circuit 34A may execute the determination by using the first threshold value TH1.

The first threshold value TH1 and the second threshold value TH2 may be the same value. That is, the first threshold value TH1 may be identical to the second threshold value TH2.

The communication standards of the interface of the present disclosure are not limited to the communication standards of the USB PD standards, and may be other communication standards under which electric power can be transferred.

In the above embodiment, the CPU 12 executes the processing of setting the switch circuit 33 to the off state to stop the supply of electric power, in S31. However, the CPU 12 may also execute restriction processing of reducing the voltage value or the current value. That is, the CPU 12 may not completely stop the supply of electric power.

When the electric power abnormality is detected by one of the first voltage detection circuit 34 and the second voltage detection circuit 35, the CPU 12 executes the processing of stopping the supply of electric power. However, the CPU 12 may execute the processing of stopping the supply of electric power only when the electric power abnormality is detected by both the first voltage detection circuit 34 and the second voltage detection circuit 35.

When the supply voltage Vs is equal to or higher than the first threshold value TH1 (S37: YES), the CPU 12 again executes the negotiation (S41). However, the CPU 12 may execute only the stop of the supply of electric power without executing the negotiation.

The CPU 12 executes the processing of S33 of notifying the occurrence of the electric power abnormality but may not execute the notification processing.

The storing destination of the abnormality detection information 45 is not limited to the NVRAM 15. For example, the CPU 12 may also store the abnormality detection information 45 in the RAM 13 or the ROM 14. The CPU 12 may store the abnormality detection information 45 in a USB memory connected to the USB connection unit 19 or in a server apparatus on a network connected to the user interface 20. In this case, the USB memory and the server apparatus are examples of the storage device of the present disclosure.

The CPU 12 may not execute the processing of S35 of storing the abnormality detection information 45. The CPU 12 may not execute the processing of S21 and S23 of determining whether the abnormality detection information 45 is stored, upon the activation of the power supply unit 27. The CPU 12 may execute the processing of S27 and thereafter, as the electric power supply restriction processing shown in FIGS. 4 and 5.

In the above embodiment, the CPU 12 is adopted as the controller of the present disclosure. However, the present disclosure is not limited thereto. For example, at least some of the controller may be configured by dedicated hardware such as an ASIC (Application Specific Integrated Circuit). The controller may be configured to operate in combination with software processing and hardware processing, for example.

The configuration of the information processing apparatus of the above embodiment is an example. For example, the power supply unit 27 may not include the battery 31.

In the above embodiment, the portable printer 1 is adopted as the information processing apparatus of the present disclosure. However, the present disclosure is not limited thereto. For example, the information processing apparatus of the present disclosure may also be a stationary printer, not the portable type, and is not limited to the printer and may also be a copy device, a fax device or a scanner device. The information processing apparatus of the present disclosure may be a complex machine having a plurality of functions. For example, the information processing apparatus of the present disclosure may include a FAX communication unit which transmits and receives FAX data to and from another facsimile device via a phone line. The information processing apparatus of the present disclosure is not limited to the image forming apparatus including the image forming unit 16 and the image scanning unit 17. For example, as the information processing apparatus, a variety of electronic devices having an interface through which electric power can be supplied, such as a camera and a sewing machine, can be adopted.

What is claimed is:
1. An information processing apparatus comprising:
a power supply;
an interface;

a first detector configured to detect at least one of a voltage value and a current value on an electric power line that connects the power supply and the interface;
a second detector configured to detect at least one of a voltage value and a current value on the electric power line;
a switch configured to switch a supply of electric power supplied from the interface to an outside; and
a controller configured to:
control the switch to restrict the electric power supplied from the interface to an outside in a case where at least one of a detection value of the first detector and a detection value of the second detector is equal to or greater than a threshold value.

2. The information processing apparatus according to claim 1,
wherein the controller performs the controlling of the switch to restrict the electric power supplied from the interface to the outside in a case where a detection value of the first detector is equal to or greater than a first threshold value or in a case where a detection value of the second detector is equal to or greater than a second threshold value.

3. The information processing apparatus according to claim 2,
wherein the first threshold value is identical to the second threshold value.

4. The information processing apparatus according to claim 2,
wherein the first threshold value is different from the second threshold value.

5. The information processing apparatus according to claim 2,
wherein the controller is configured to execute negotiation with an external device connected to the interface for deciding electric power supplied to the external device,
the first threshold value is a value set based on the electric power supplied to the external device, which is decided in the negotiation, and
the second threshold value is a predetermined fixed value.

6. The information processing apparatus according to claim 5,
wherein the second threshold value is equal to or greater than the first threshold value and is based on a maximum value of electric power allowed to be supplied from the interface.

7. The information processing apparatus according to claim 5,
wherein when the controller performs the controlling of the switch to restrict the electric power supplied from the interface to the outside in the case where a detection value of the first detector is equal to or greater than the first threshold value, the controller controls the switch to stop the supply of electric power from the interface to an external device and thereafter executes the negotiation with the external device.

8. The information processing apparatus according to claim 7,
wherein the first detector outputs a first detection signal indicating the detection value to the controller, and
the controller is configured to:
determine whether the detection value indicated by the first detection signal is equal to or greater than the first threshold value; and
control the switch to restrict the electric power supplied from the interface to the outside, based on a result of the determination.

9. The information processing apparatus according to claim 5,
wherein when the controller performs the controlling of the switch to restrict the electric power supplied from the interface to the outside in the case where a detection value of the second detector is equal to or greater than the second threshold value, the controller controls the switch to stop the supply of electric power from the interface to an external device.

10. The information processing apparatus according to claim 9,
wherein the second detector outputs, to the controller, a determination result as to whether the detection value of the second detector is equal to or greater than the second threshold value, as a second detection signal, and
the controller performs the controlling of the switch to restrict the electric power supplied from the interface to the outside, based on the second detection signal.

11. The information processing apparatus according to claim 1,
wherein in a case where at least one of detection values of the first detector and the second detector exceeds a threshold value, the controller notifies that the detection value exceeds the threshold value.

12. The information processing apparatus according to claim 1,
wherein in a case where at least one of detection values of the first detector and the second detector exceeds a threshold value, the controller stores abnormality detection information, which indicates that the detection value exceeds the threshold value, in a storage device.

13. The information processing apparatus according to claim 12,
wherein the controller is configured to:
determine whether the abnormality detection information, which indicates that the detection value exceeds the threshold value, is stored in the storage device, upon activation of the power supply; and
control the switch to restrict the electric power supplied from the interface to an outside in a case where it is determined as a result of the determination that the abnormality detection information is stored in the storage device.

14. The information processing apparatus according to claim 1,
wherein the interface is a USB (Universal Serial Bus) interface.

15. The information processing apparatus according to claim 1, comprising at least one of:
an image forming unit configured to form an image based on image data; and
an image scanning unit configured to scan an image of a document.

16. A control method of an information processing apparatus including:
a power supply;
an interface;
a first detector configured to detect at least one of a voltage value and a current value on an electric power line that connects the power supply and the interface;
a second detector configured to detect at least one of a voltage value and current value on the electric power line; and
a switch configured to switch a supply of electric power supplied from the interface to an outside, the control method comprising the step of:
controlling the switch to restrict the electric power supplied from the interface to an outside in a case where at least one of a detection value of the first detector and a detection value of the second detector is equal to or greater than a threshold value.

17. The control method according to claim 16,
wherein the controlling of the switch to restrict the electric power supplied from the interface to the outside is performed in a case where a detection value of the first detector is equal to or greater than a first threshold value or in a case where a detection value of the second detector is equal to or greater than a second threshold value.

18. The control method according to claim 17,
wherein the first threshold value is identical to the second threshold value.

19. The control method according to claim 17,
wherein the first threshold value is different from the second threshold value.

20. The control method according to claim 17,
wherein the control method further comprises the step of executing negotiation with an external device connected to the interface for deciding electric power supplied to the external device,
the first threshold value is a value set based on the electric power supplied to the external device, which is decided in the negotiation, and
the second threshold value is a predetermined fixed value.

21. A non-transitory computer-readable storage medium storing a computer program, when executed by a computer mounted on an information processing apparatus including:
a power supply;
an interface:
a first detector configured to detect at least one of a voltage value and a current value on an electric power line that connects the power supply and the interface;
a second detector configured to detect at least one of a voltage value and a current value on the electric power line; and
a switch configured to switch a supply of electric power supplied from the interface to an outside,
the computer program being configured to cause the information processing apparatus to:
control the switch to restrict the electric power supplied from the interface to an outside in a case where at least one of a detection value of the first detector and a detection value of the second detector is equal to or greater than a threshold value.

\* \* \* \* \*